United States Patent [19]

Suehiro et al.

[11] Patent Number: 5,464,604

[45] Date of Patent: Nov. 7, 1995

[54] METHOD FOR PURIFYING HIGH-TEMPERATURE REDUCING GAS

[75] Inventors: Mitsugi Suehiro, Tokyo; Toru Seto, Hiroshima; Shigeaki Mitsuoka, Hiroshima; Kenji Inoue, Hiroshima, all of Japan

[73] Assignee: Mitsubishi Jukogyo Kabushiki Kaisha, Tokyo, Japan

[21] Appl. No.: 234,716

[22] Filed: Apr. 28, 1994

Related U.S. Application Data

[63] Continuation of Ser. No. 951,944, Sep. 28, 1992, abandoned, which is a continuation of Ser. No. 721,917, Jun. 20, 1991, abandoned, which is a continuation of Ser. No. 457,284, Dec. 27, 1989, abandoned.

[30] Foreign Application Priority Data

Jan. 5, 1989 [JP] Japan .......................................... 64-132

[51] Int. Cl.$^6$ ........................... B01D 53/48; B01D 53/52; C01B 17/04
[52] U.S. Cl. ........................... 423/570; 423/230; 423/231; 423/567.1; 423/574.1
[58] Field of Search ................................ 423/567.1, 570, 423/574.1, 230, 231

[56] References Cited

U.S. PATENT DOCUMENTS

| | | | |
|---|---|---|---|
| 1,695,068 | 12/1928 | Thompson | 423/570 |
| 1,771,481 | 7/1930 | Benner et al. | 423/570 |
| 1,840,076 | 1/1932 | Bacon | 423/567 |
| 2,747,968 | 5/1956 | Pigache | 423/230 |
| 3,931,393 | 1/1976 | Palilla | 423/570 |
| 4,027,001 | 5/1977 | Henderson et al. | 423/570 |
| 4,088,736 | 5/1978 | Courty et al. | 423/230 |
| 4,155,990 | 5/1979 | Kimura et al. | 423/574 R |
| 4,180,549 | 12/1979 | Olsson | 423/230 |
| 4,599,161 | 7/1986 | Scinta et al. | 423/230 |
| 4,954,331 | 9/1990 | Lee et al. | 423/230 |
| 4,994,257 | 2/1991 | Suehiro et al. | 423/577 |

FOREIGN PATENT DOCUMENTS 2738383 3/1978 Germany.

OTHER PUBLICATIONS

Peters and Timmerhaus, Plant Design and Economics for Chemical Engineers, 3rd ed., published 1980 by McGraw–Hill Book Co. (N.Y.), pp. 568–575, 788.
Chemistry, Bailar et al., Academic Press, 1978, p. 454.
Chemical Abstracts, vol. 98, No. 14, Apr. 1983, pp. 141 No. 98109846e, JP-A-57 184 418.

Primary Examiner—Jeffrey E. Russel
Attorney, Agent, or Firm—McAulay Fisher Nissen Goldberg & Kiel

[57] ABSTRACT

Disclosed are, in a method for purifying a high-temperature reducing gas in which sulfur compounds present in a high-temperature reducing gas are absorbed and removed by an absorbent according to a dry method, a method for purifying a high-temperature reducing gas which is characterized in that a reducing gas is supplied into a gas containing sulfur dioxide gas which is discharged from a regeneration system for regenerating the absorbent which system forms a system together with an absorption system in which the sulfur compounds are absorbed with the absorbent, a resulting gas mixture is led through a reactor filled with a catalyst, the sulfur dioxide gas and the reducing gas are let react with each other under pressurization so that elemental sulfur is directly produced and recovered as liquid sulfur; and the above method which is further characterized in that catalyst layers in the reactor in which the sulfur dioxide gas and the reducing gas react with each other are divided into parts or made to have a plurality of stages, a heat exchanger and a sulfur condenser are disposed between these parts or stages, and the temperature control of these gases and the removal of sulfur produced in the reaction are carried out during the reaction.

1 Claim, 1 Drawing Sheet

METHOD FOR PURIFYING HIGH-TEMPERATURE REDUCING GAS

This is a continuation of application Ser. No. 07/951,944, filed Sep. 28, 1992, now abandoned, which, in turn, is a continuation of application Ser. No. 07/721,917, filed Jun. 20, 1991, now abandoned, which, in turn, is a continuation of application Ser. No. 07/457,284, filed Dec. 27, 1989, now abandoned.

FIELD OF THE INVENTION AND RELATED ART STATEMENT

The present invention relates to a method for purifying a high-temperature reducing gas. More specifically, it relates, for example, to a method for efficiently removing sulfur compounds, such as hydrogen sulfide and carbonyl sulfide, from a high-temperature reducing gas produced in a coal gasification process.

In recent years, as a result of the exhaustion of petroleum resources and the rise in their price, much attention has been paid to a variety of fuels and raw materials, and utilization techniques of coals and heavy oils (tar sand, shale oil, Maya crude oil, Chinese Taikei Crude oil, residual oil under reduced pressure, and the like) have been developed. However, resulting gasified product gases contain several hundreds to several thousands ppm of sulfur compounds such as hydrogen sulfide ($H_2S$), carbonyl sulfide (COS) and the like, depending on the kind of starting materials such as coal or heavy oil used. These sulfur compounds have to be removed in order to avoid environmental pollution and prevent devices on the downstream side from corroding.

As a method for the removal of sulfur compounds, a dry method is known to be better economically and otherwise. Because the processes and devices involved are simpler in a dry method, commonly used is a method of removing sulfur compounds by letting an absorbent having metal oxides as main components come into contact with the above sulfur compounds at a high temperature and turning the metal oxides into sulfides.

Metal oxides of Fe, Zn, Mn, Cu, Mo and W are used as absorbent and let come in contact with hydrogen sulfide ($H_2S$), carbonyl sulfide (COS) and the like at a temperature of about 250° to 500° C. As an example, we will show reactions for removing $H_2S$ present in the above high-temperature reducing gas using $Fe_2O_3$. Absorption reactions are known to proceed as shown by Equations (1) to (4) below.

$$3Fe_2O_3 + H_2 \rightarrow 2Fe_3O_4 + H_2O \quad (1)$$

$$3Fe_2O_3 + CO \rightarrow 2Fe_3O_4 + CO_2 \quad (2)$$

$$Fe_3O_4 + H_2 + 3H_2S \rightarrow 3FeS + 4H_2O \quad (3)$$

$$Fe_3O_4 + CO + 3H_2S \rightarrow 3FeS + 3H_2O + CO_2 \quad (4)$$

Subsequently, the absorbent after absorption is regenerated by a gas containing oxygen and turned into the starting metal oxide back again as shown in Equation (5). By repeating these absorption and regeneration processes, the sulfur compounds in a high-temperature reducing gas are removed as $SO_2$ gas and collected.

$$4FeS + 7O_2 \rightarrow 2Fe_2O_3 + 4SO_2 \quad (5)$$

The absorbent used in this method is one or more of the metal oxides mentioned above by themselves or as carried by a porous material which is heat resistant. In the case of a reactor being a moving bed system, the absorbent is normally shaped into a sphere or an extrusion, and in the case of a fixed bed system its shape is usually a honeycomb.

The inventors of the present invention have proposed the following method:

(1) In a method of removing sulfur compounds present in a high-temperature reducing gas by absorbing them using an absorbent having metal oxides as main components, a method for purifying a high-temperature reducing gas which comprises and continuously repeats the steps of:

regenerating the absorbent which has absorbed the sulfur compounds using a gas containing oxygen;

subsequently reducing the regenerated absorbent using the high-temperature reducing gas until the concentration of the reducing gas becomes constant before and after passing the absorbent; and removing sulfur compounds by letting the high-temperature reducing gas pass through the absorbent in order to stabilize the concentration of the reducing gases present in the purified gas (Japanese Patent Application No. 85412/1985).

The inventors of the present invention have also proposed the following methods for purifying a high-temperature reducing gas by absorbing and removing sulfur compounds present therein, such as hydrogen sulfide and carbonyl sulfide, using an absorbent:

(2) In a method for purifying a high-temperature reducing gas which continuously repeats the steps of absorbing and removing sulfur compounds such as $H_2S$ and COS present in the high-temperature reducing gas with an absorbent filled in reactors by repeating the steps of regenerating the absorbent, and absorbing and removing sulfur compounds with the absorbent after reducing the regenerated absorbent until the concentration of the reducing gas at the inlet and outlet of the absorbent layers, a method for purifying a high-temperature gas which is characterized in that it uses at least three reactors filled with an absorbent and said steps consist of the four steps of absorption, preliminary regeneration, regeneration and reduction; and the performance of the absorption and regeneration steps is stabilized by absorbing and removing sulfur compounds from the high-temperature reducing gas which is passed through the absorbent (Japanese Patent Application No. 167814/1987).

(3) In a method for absorbing and removing sulfur compounds such as $H_2S$ and COS present in a high-temperature reducing gas, a method for purifying a high-temperature reducing gas which is characterized in that:

said method comprises the four steps of an absorption and removal step for removing the sulfur compounds, a preliminary regeneration step for heating the absorbent having absorbed the sulfur compounds up to a temperature required by regeneration reactions, a regeneration step for regenerating the absorbent which has reached the temperature required by regeneration reactions using a gas containing oxygen, and a reduction step for reducing the regenerated absorbent using a high-temperature reducing gas until the concentration of the reducing gas becomes constant before and after passing through the absorbent; and when the load is low the absorption and regeneration performance is stabilized by controlling the amount of the gas circulated into said regeneration step or by controlling the amount of the gas circulated and using the heat of combustion of the high-temperature reducing gas supplied into said regeneration step (Japanese Patent Application No. 167815/1987).

(4) A method for a purifying high-temperature gas which is characterized in that:

said method comprises the four steps of an absorption step for absorbing and removing sulfur compounds, a regeneration step for regenerating the absorbent using a gas containing oxygen, a cooling step after the completion of the regeneration step, and a reduction step for reducing the regenerated absorbent using a high-temperature reducing gas until the concentration of the reducing gas becomes constant before and after passing through the absorbent; and in the regeneration step, heat is continuously recovered from the high-temperature gas discharged out of a regeneration reactor so that the absorption and regeneration performance is stabilized (Japanese Patent Application No. 27441/1988).

(5) A method for purifying a high-temperature reducing gas which is characterized in that:

said method comprises, using at least four reactors filled with an absorbent, the four steps of an absorption and removal step for removing sulfur compounds present in a high-temperature reducing gas using an absorbent, a regeneration step for regenerating the absorbent with a gas containing oxygen, a cooling step after the completion of the regeneration step, and a reduction step of reducing the regenerated absorbent with a high-temperature reducing gas; and elemental sulfur is recovered by supplying a gas containing $SO_2$ discharged from reactors in the reduction, regeneration and cooling steps to a sulfur recovery system disposed in a downstream position (Japanese Patent Application No. 227537/1988).

(6) A method for purifying a high-temperature reducing gas which is characterized in that:

said method comprises, using at least four reactor filled with an absorbent, the five steps of an absorption step for absorbing and removing sulfur compounds present in a high-temperature reducing gas using an absorbent, a preliminary regeneration step and a regeneration step for regenerating the absorbent with a gas containing oxygen, a cooling step after the completion of the regeneration step, and a reduction step of reducing the regenerated absorbent with a high-temperature reducing gas until the concentration of the reducing gas becomes constant before and after passing through the absorbent; and the regeneration step and the preliminary regeneration step are connected in series;

a line is disposed so that a high-temperature gas discharged from the regeneration step is mixed with a gas discharged from the preliminary regeneration step, and thus the heat of regeneration can be continuously recovered even while the regeneration step is being switched; and elemental sulfur is recovered by supplying a gas containing $SO_2$ discharged from reactors in the reduction, regeneration and preliminary regeneration steps to a sulfur recovery system disposed in a downstream position (Japanese Patent Application No. 228383/1988).

OBJECT AND SUMMARY OF THE INVENTION

The fixed bed type gas purification system in the above propositions comprise a reaction system including absorption, regeneration and reduction steps, and a sulfur recovery system disposed in a downstream position for treating $SO_2$ gas discharged from the regeneration step. In such systems, in order to obtain stable performance over long periods of time, a system and method which can control and limit the degradation of an absorbent used has to be employed.

Thermal degradation due to temperature increases during a regeneration process and accumulation of impurities produced by by-product reactions can be considered as causes of such absorbent degradation.

There exists some description concerning a measure against temperature increases at absorbent during regeneration in Japanese Patent Application No. 228383/1988.

As for by-product reactions, the reactions of Equations (6) and (7) below, for example, take place partially, and a part of FeS is converted to iron sulfate [$Fe_2(SO_4)_3$].

$$2FeS + SO_2 + 5O_2 \rightarrow Fe_2(SO_4)_3 \qquad (6)$$

$$2Fe_2O_3 + 6SO_2 + 3O_2 \rightarrow 2Fe_2(SO_4)_3 \qquad (7)$$

This by-product $Fe_2(SO_4)_3$ is reduced to $SO_2$ again in the reduction step according to Equations (8) and (9) below.

$$3Fe_2(SO_4)_3 + 10H_2 \rightarrow 2Fe_3O_4 + 9SO_2 + 10H_2O \qquad (8)$$

$$3Fe_2(SO_4)_3 + 10CO \rightarrow 2Fe_3O_4 + 9SO_2 + 10CO_2 \qquad (9)$$

If this used reducing gas containing $SO_2$ is returned to the reactor in the absorption step, $SO_2$ is absorbed by an absorbent in this reactor according to, for example, Equations (10) and (11) below.

$$Fe_3O_4 + 3SO_2 + 10H_2 \rightarrow 3FeS + 10H_2O \qquad (10)$$

$$Fe_3O_4 + 3SO_2 + 10CO \rightarrow 3FeS + 10CO_2 \qquad (11)$$

$Fe_3O_4$ reacting in Equations (10) and (11) should instead be used in the absorption of $H_2S$ in Equations (3) and (4) and represents a loss of $Fe_3O_4$ useful in absorbing $H_2S$, reducing the absorption capability.

Also, $H_2$ and $CO$ reacting in Equations (10) and (11) should basically be a main component for a gas produced by coal gasification and are a cause of energy losses.

Therefore, the by-product reactions of $Fe_2(SO_4)_3$, such as those in Equations (6) and (7) in particular, should be suppressed as much as possible.

To this end, the regeneration should be carried out at a temperature as high as possible within the higher limit of temperature which an absorbent can withstand, and it is also necessary that the concentration of $SO_2$ is reduced as much as possible.

As a gas for regenerating the absorbent, a gas which has been processed in the sulfur recovery system and into which the air or a gas containing oxygen is mixed can be used. Therefore, the efficiency of sulfur recovery at the sulfur recovery system should be improved, and the sulfur components ($SO_2$, $H_2S$, gaseous sulfur and the like) should be reduced to a minimum in order to control the occurrence of by-product reactions of $Fe_2(SO_4)_3$.

It is an object of the present invention to improve the collection efficiency of sulfur in the sulfur recovery system and, by doing so, prevent the absorbent from degrading due to by-product reactions and also reduce costs involved with the entire system including absorption and regeneration systems.

The present invention resolves the above problems by using reactors filled with a catalyst, such as Ni—Mo type and Co—Mo type catalysts, and by letting sulfur dioxide gas from the regeneration step react with a reducing gas, and by thus producing elemental sulfur efficiently and directly.

That is, in a method for purifying a high-temperature reducing gas in which sulfur compounds present in a high-temperature reducing gas are absorbed and removed by an absorbent according to a dry method and which uses reactors filled with an absorbent and comprises an absorption system and a regeneration system, the present invention relates to a method for purifying a high-temperature reducing gas which is characterized in that:

(1) as a method for treating sulfur dioxide gas discharged from a regeneration system, a reducing gas, such as $H_2$, CO, $CH_4$, $C_3H_8$, mixtures of these gases and coal gasification gas, is supplied to the sulfur dioxide gas with a given ratio to the sulfur dioxide gas, the resulting gas mixture passes through a reactor filled with an catalyst so that the sulfur dioxide gas and the reducing gas react with each other under pressurization so that elemental sulfur is directly produced and recovered as liquid sulfur; and (2) catalyst layers in the reactor are divided into parts or made to have a plurality of stages, and a heat exchanger and a sulfur condenser are disposed between them so that the temperature control of these gases can be achieved and product sulfur can be removed during reaction between the sulfur dioxide gas and reducing gas to further improve the efficiency of sulfur recovery system.

Furthermore, after the gas discharged from the sulfur recovery system as described in (1) and (2) above is supplied in part to the absorption system, it is used as a circulation gas to the regeneration system in order to stabilize absorption and regeneration performance.

DETAILED DESCRIPTION OF PREFERRED EMBODIMENTS

Figure 1:
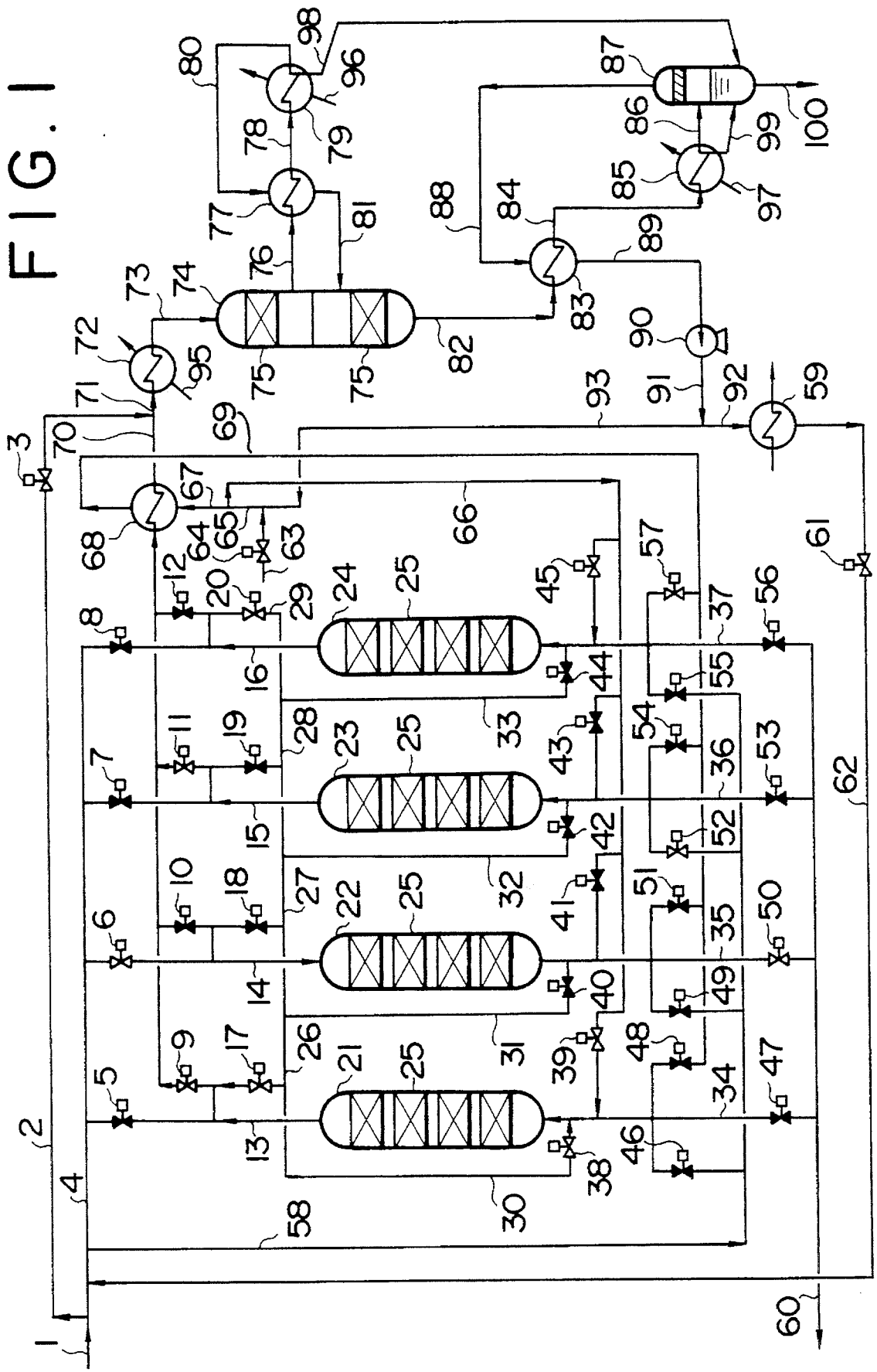
FIG. 1 shows flows to describe an embodiment of the method of the present invention.

The present invention is based on an improvement on reactions to produce elemental sulfur directly from sulfur dioxide gas and a reducing gas under pressurization. Higher pressure is advantageous compared to atmospheric pressure in terms of chemical equilibrium. As pressure increases, not only the production of sulfur increases, but also the chemical equilibrium can be reached with a relatively small amount of catalyst, and the volume of the reactor ($SO_2$ converter) can therefore be considerably smaller.

The waste gas treated at the $SO_2$ converter is circulated and used as a gas for regeneration. Therefore, the concentration of sulfur dioxide gas in the gas entering the regeneration system should be as small as possible in order to control the sulfating of absorbent in the regeneration system to $FeSO_4$ or $Fe_2(SO_4)_3$ or the like since this sulfating leads to the degradation of absorbent.

To this end, the recovery rate of sulfur at the sulfur recovery system should be improved, and by putting pressure the production efficiency of sulfur at the first stage of the catalyst layer in the $SO_2$ converter is considerably increased.

Also, in the present invention, the production of sulfur is further improved when the catalyst layer in the $SO_2$ converter, which is operated more efficiently under higher pressures compared to operation at atmospheric pressure, is divided into a plurality of layers or into a plurality of stages.

That is, by dividing the catalyst layers in the $SO_2$ converter into a plurality of parts or into a plurality of stages, and by disposing a heat exchanger and a sulfur condenser in between, after the recovery of almost all of sulfur produced in the first stage of catalyst layers as liquid sulfur, the temperature of gas entering the next stage of the catalyst layers is controlled to be equal to or lower than that of the previous stage so that the reaction between $SO_2$ and reducing gas, which proceeds advantageously at lower temperatures, is promoted to produce sulfur, and sulfur is recovered as liquid sulfur. Thus, after sulfur is recovered in the sulfur recovery system, almost all of the sulfur dioxide gas discharged from a process for regenerating the absorbent having been used for absorption of sulfur compounds can be removed.

The waste gas discharged from the $SO_2$ converter contains almost none of sulfur and $SO_2$ gas and can be circulated and used for regeneration.

As explained above, the present invention is to improve conventional methods for purifying a high-temperature reducing gas in terms of better protection of absorbent and more stable performance.

The present invention will be described in detail with reference to examples below. However, it should be understood that these embodiments do not at all restrict the scope of the present invention and are meant only to illustrate the present invention as defined in the claims.

FIG. 1 shows an embodiment of the method of the present invention.

In FIG. 1, numerals 1, 2, 4 and 58 indicate lines for high-temperature reducing gas which has been removed of dust and contains sulfur compounds, such as $H_2S$ and COS. Numerals 3, 5–8, 46, 49, 52 and 55 indicate flow switching valves for this gas. Numerals 9–12 indicate switching valves for a gas containing relatively concentrated sulfur compounds from reactors in the regeneration and reduction steps. Numerals 17–20 indicate flow switching valves for mixing a high-temperature gas discharged from a regeneration reactor with a gas discharged from a preliminary regeneration reactor.

Numerals 21–24 indicate reactors filled with an absorbent 25 which is divided into a plurality of parts (four in this example). Numerals 47, 50, 53 and 56 denote flow switching valves for purified gas from reactors in the absorption step. Numerals 48, 51, 54 and 57 indicates flow switching valves for supplying a regeneration gas to reactors in the regeneration step. Numerals 39, 41, 43 and 45 represent flow switching valves for supplying a cool gas containing oxygen to reactors in the preliminary regeneration step.

Numeral 14 is a high-temperature reducing gas line, corresponding to numeral 1 of FIG. 1.

Numerals 31, 32 and 33 are circulation gas lines in the regenerating step, corresponding to number 30 of FIG. 1.

Numeral 60 denotes a line for taking out purified gas, numeral 69 a circulation line for a regeneration gas, numeral 62 a branch line for a gas line 91 which will be explained later, numeral 61 a flow switching valve for said branch line 62, numerals 63 and 64 a line and a flow switching valve for supplying the air or a gas containing oxygen, respectively, numerals 59, 68, 72, 77 and 83 heat exchangers, numerals 66 and 67 branch lines of line 65, numeral 70 a line for a gas which contains relatively high concentrations of sulfur compounds and which has been cooled at the heat exchanger 68, numeral 74 a reactor ($SO_2$ converter) filled with catalyst 75 which is divided into a plurality of parts (two in this example), and numerals 79 and 85 sulfur condensers.

Numerals 71, 73, 76, 78, 80–82, 84, 86, 88, 89, and 91–93 indicate gas lines, numeral 87 a separator of sulfur mist, numeral 90 a blower, numerals 95–97 lines for supplying water (or cooling water) to a boiler, numerals 98–100 lines for recovering liquid sulfur.

FIG.1 shows an embodiment of the present invention in which the reactors 21–24 with an identical structure filled with absorbent 25 are switched, in turn, in the succession of the reduction step according to Equations (1) and (2), the absorption step according to Equations (3) and (4), and the regeneration step according to Equation (5). The present invention, however, is not restricted to the fixed-bed type as in this embodiment and can also be applied to the fluidized-bed type or to the moving-bed type if a system in question uses a process in which the regeneration according to Equation (5) is repeated after the absorption and removal of sulfur compounds such as $H_2S$ and COS with an absorbent. Also, the present invention can of course be used for the fixed-bed type with more than four towers. Furthermore, although the composition and shape of the absorbent used are by no means restricted, $Fe_2O_3$ will be used for the absorbent here only to show an example.

A high-temperature reducing gas in line 1 produced, for example, by the gasification of coal is treated in a dust collector (not shown) to get rid of dust until the concentration of dust is about 10 mg/Nm³. The reducing gas contains, depending on gasification conditions and the kind of coal used, several tens to several thousands ppm of $H_2S$, COS, $NH_3$ and halogen compounds besides dust, its temperature is about 250° to 500° C. because of heat recovery at the outlet of a gasification furnace (gasifier), and its pressure is between the atmospheric pressure and about 25 kg/cm²G depending on the type of a gasification furnace employed.

FIG. 1 shows the system at the moment when the preliminary regeneration step is carried out in the reactor 21, the absorption step is carried out in the reactor 22, the reduction step in the reactor 23, and the regeneration step in the reactor 24.

Operation will be explained below with reference to FIG. 1, assuming that the operation of the sulfur recovery system with the absorption, preliminary regeneration, regeneration, cooling and reduction steps is carried out at about 10–25 kg/cm²G.

In FIG. 1, a gas in line 1 produced in a gasification process and treated to remove dust therefrom is supplied to the reactor 22 through flow switching valve 6. Sulfur compounds present in the gas are absorbed and removed by the absorbent 25 according to Equations (3) and (4) normally at about 300°–500° C. The gas thus purified is supplied to a gas turbine (not shown) in the downstream from line 60 through a switching valve 50.

During the preliminary regeneration step, the gas which has finished the regeneration step at the reactor 24 is led to the reactor 21 through line 16, flow switching valve 20, lines 26–30 and flow switching valve 38.

The reactor 23 is in the course of the reduction step, and a gas for regeneration is led into the reactor 23 from gas line 58, which branches out from gas line 4, via flow switching valve 52.

The gas that discharges from the reactor 23 and contains $SO_2$ flows into the gas which has undergone the preliminary regeneration step via gas line 15 and flow switching valve 11. The gas is then cooled by the heat exchanger 68 and led to the sulfur recovery system so that the sulfur is recovered.

The gas that has passed through the heat exchanger 68 is led to the heat exchanger 72 via lines 70 and 71 and is adjusted to a proper temperature (between about 250° and 300° C.) by $SO_2$ conversion reactions. The amount of the gasification gas 2 (which has been removed of dust), which is supplied to the above line 71 via switching valve 3 and mixed with the gas containing $SO_2$ described above, corresponds to that of sulfur dioxide gas ($SO_2$ gas) in this gas (in the case of $H_2$ or CO, the amount is twice that of $SO_2$ gas).

This mixture gas 73 is led to the $SO_2$ converter 74 filled with catalyst 75, such as Ni—Mo or Co—Mo type, which is divided into two stages, and reactions take place to produce elemental sulfur (gaseous).

These reactions progress more favorably in terms of chemical equilibrium or in practical terms if temperature is lower. It is therefore important to operate in a lower temperature range in which the gas entering the $SO_2$ converter 74 does not reach the dew point of gaseous sulfur.

The main reactions in the conversion of $SO_2$ gas to sulfur are the following:

$$SO_2 + 2H_2 \rightarrow (1/x)S_x + 2H_2O \qquad (12)$$

$$SO_2 + 2CO \rightarrow (1/x)S_x + 2CO_2 \qquad (13)$$

where x=2–8.

As by-product reactions the following reactions, Equations (14) and (15), take place to produce $H_2S$, COS and the like.

$$SO_2 + 3H_2 \rightarrow H_2S + 2H_2O \qquad (14)$$

$$SO_2 + 3CO \rightarrow COS + 2CO_2 \qquad (15)$$

Fortunately, however, it has been confirmed by laboratory tests that only a very small quantity of COS (compared with $H_2S$), which is undesirable in the absorption step described above and results in a slow reaction rate, is produced.

Also, while under atmospheric pressure the percentage production of elemental sulfur is around 50% at most and is not very high because the reactions of Equations (14) and (15) occur as well as those of Equations (12) and (13), it can improve to more than 80% under pressurization (see Table 1). Furthermore, while the temperature of the gas entering the $SO_2$ converter has to be around 300° to 400° C. under atmospheric pressure, under pressurization the reactions proceed at relatively lower temperatures between about 200° and 300° C. Therefore, it is more advantageous to pressurize from the view point of energy consumption, and the percentage sulfur production improves in terms of chemical equilibrium and in practical terms as pressure goes up. As a result, the amounts of by-products such as $H_2S$ and COS produced are advantageously reduced under pressurization.

Furthermore, the conversion reactions of $SO_2$ to sulfur are exothermic, and, as the concentration of $SO_2$ in gas entering the $SO_2$ converter 74 increases, the temperature of gas discharged from the converter 74 goes up because of the heat of conversion reactions. The heat of conversion reactions generated here is recovered effectively by heating the gas circulated from the sulfur recovery system to the regeneration system (the reactor 24 in FIG. 1) at the heat exchanger 83.

Also, depending on the choice of catalyst 75, the conversion reaction of $SO_2$ to sulfur proceeds almost to the chemical equilibrium at relatively large SV values (2,000 to 10,000 hr$^{-1}$), and the size of the SO$_2$ converter 74 can therefore be comparatively small.

The gas having reacted at the first stage in the catalyst layers of the SO$_2$ converter 74 undergoes heat exchange at the heat exchanger 77 and cools down, and it is then led to the sulfur condenser 79 and cooled down to around 130° to 200° C. A part of heat is also recovered here, and almost all of product sulfur is recovered to line 98 as liquid sulfur. Thus, by recovering the produced sulfur at the first stage of the catalyst layers in the sulfur condenser 79, reactions in the second stage of the catalyst layers are promoted, and the production rate of sulfur is improved.

After the gas discharged from the sulfur condenser 79 is heated at the heat exchanger 77 to a given temperature (around 200° to 250° C.), it is led to the second stage of the catalyst layers, and the conversion reactions are further carried out for the remaining SO$_2$.

By carrying out the above two stage operation of the catalyst layers of the SO$_2$ converter 74, a total performance of around 90% production of sulfur can be achieved, even when only about 80 some percent may be achieved with single stage operation under pressurization (see Table 2).

TABLE 1

|  | React on conditions | | | Sulfur pro- duction (%)* |
| --- | --- | --- | --- | --- |
|  | Gas temp. (°C.) | Pressure (ata) | SO$_2$ conc. (vol %) |  |
| Comparative test example 1 | 250 | 1.0 | 1.0 | 5 |
|  | 300 | 1.0 | 1.0 | 30 |
|  | 350 | 1.0 | 1.0 | 53 |
|  | 400 | 1.0 | 1.0 | 34 |
|  | 450 | 1.0 | 1.0 | 10 |
| Test example 1 | 200 | 10.0 | 1.0 | 50 |
|  | 250 | 10.0 | 1.0 | 78 |
|  | 300 | 10.0 | 1.0 | 68 |
|  | 350 | 10.0 | 1.0 | 58 |
|  | 400 | 10.0 | 1.0 | 47 |
| Test example 2 | 200 | 20.0 | 1.0 | 53 |
|  | 250 | 20.0 | 1.0 | 82 |
|  | 300 | 20.0 | 1.0 | 72 |
|  | 350 | 20.0 | 1.0 | 63 |
|  | 400 | 20.0 | 1.0 | 51 |

*Percentage sulfur production
= {(amount of sulfur produced)/(incoming SO$_2$)} × 100
Other conditions: SV value was 3500 hr$^{-1}$, (H$_2$ + CO)/SO$_2$ = 2.0, and the catalyst was not divided in any of the above examples.

TABLE 2

| Reactor | Reaction conditions | | | Sulfur production (%) |
| --- | --- | --- | --- | --- |
|  | Gas temp. (°C.) | Pressure (ata) | SO$_2$ conc. (vol %) |  |
| Test example 3 | | | | |
| Stage 1 | 250 | 10.0 | 1.0 | 61 |
| Stage 2 | 250 | 10.0 | 0.23** | 47 |
| Total | 250 | 10.0 | — | 79.3 |
| Test example 4 | | | | |
| Stage 1 | 250 | 20.0 | 1.0 | 78 |
| Stage 2 | 250 | 20.0 | 0.16** | 58 |
| Total | 250 | 20.0 | — | 90.0 |

**SO$_2$ concentration (%) at the entrance to the 2nd stage = (SO$_2$ conc. (%) at the entrance to the 1st stage) × (1.0 − SO$_2$ reaction efficiency at the 1st stage), and SO$_2$ reaction efficiency at the 1st stage = 1.0 − {(SO$_2$ conc. (%) at the outlet from the 1st stage)/(entrance SO$_2$ conc. (%))}.

TABLE 2-continued

| Reactor | Reaction conditions | | | Sulfur production (%) |
| --- | --- | --- | --- | --- |
|  | Gas temp. (°C.) | Pressure (ata) | SO$_2$ conc. (vol %) |  |

Other conditions: SV value at each stage was 7000 hr$^{-1}$, and (H$_2$ + CO)/SO$_2$ = 2.0.

Other conditions: SV value at each stage was 7000 hr$^{-1}$, and (H$_2$+CO)/SO$_2$=2.0.

As seen clearly in Table 1, there exists some constraint with the one stage operation in terms of chemical equilibrium, and therefore very high performance cannot be expected. As shown in Table 2, however, according to the two stage operation, high performance can be achieved and the operation becomes very effective. Thus, by achieving such high performance (high sulfur production efficiency) with the two stage operation, the recovery of sulfur is improved greatly. This is also effective in controlling by-product reactions in the regeneration step, to which the treated waste gas is circulated from line 89 and used. As a result, negative influence on the reduction and regeneration steps can be prevented.

Next, the gas which comes out of the second stage of the catalyst layers in the SO$_2$ converter 74 goes through the heat exchanger 83 and the sulfur condenser 85 in the same way as at the first stage, and product sulfur is recovered as liquid sulfur to line 99. All of the recovered sulfur is drawn out from the sulfur separator 87 through line 100 as liquid sulfur. The outlet gas from the sulfur condenser 85 is led into the sulfur separator 87 from line 88. While a part of the gas from which sulfur has been separated is returned to gas line 1, which is an inlet to the absorption step, through line 88 and the heat exchanger 83 and the blower 90, the remaining gas is led to the regeneration step from line 93 and circulated to be used for regeneration.

The air or a gas containing oxygen for regeneration is mixed into gas line 93 through line 63 and flow switching valve 64. Most of it (1–3 vol % as O$_2$ concentration) is sent to the heat exchanger 68 from line 67, and heated to a certain temperature (around 400° to 500° C.) required for regeneration and then returned to the reactor 24 through gas line 69 and flow switching valve 57 to be circulated and used for regeneration.

Also, at the preliminary regeneration step, in order to adjust the temperature of entering gas to a certain temperature (around 400° to 500° C.), a cool gas containing oxygen is supplied to the reactor 21 through branch line 66 of gas line 65 and gas flow switching valve 39 and mixed with the gas 30 discharged from the reactor 24, and preliminary regeneration is carried out.

The gas discharged from the reactor 21 is led to the heat exchanger 68 through gas line 13 and gas flow switching valve 9, and the conversion of SO$_2$ in this gas to sulfur (sulfur recovery) is carried out.

After the preliminary regeneration step at the reactor 21 is finished, it is switched to the regeneration step, the reactor 22 to the preliminary regeneration step, the reactor 23 to the absorption step, and the reactor 24 to the reduction step.

As described above, according to the method of the present invention, the SO$_2$ gas discharged from the regeneration step is converted directly to elemental sulfur under the presence of catalyst such as Ni—Mo and Co—Mo types and under pressurization (preferably 10–25 kg/cm$^2$G). Thus, the sulfur production (recovery) is improved by about 30 to 50% compared with atmospheric pressure.

Also, if the catalyst layers in the SO$_2$ converter are divided into a plurality of parts or into a plurality of stages and operation is carried out under pressurization as described above, the sulfur collection is further improved (by about 10% in the case of two stages) and the concentration of sulfur compounds, such as $SO_2$, $H_2S$ and COS, in the circulation gas to the regeneration step can also be decreased further.

As a result, because the production of by-products such as sulfates at the regeneration step can be controlled and thus negative influence on other steps can be prevented, the reliability of a total system for purifying a high-temperature reducing gas is improved.

Because of improved sulfur collection efficiency, the consumption of the air for regeneration, the consumption of reducing gas at the reduction step and the absorption load of sulfur compounds at the absorption step can be effectively reduced. As a result, the consumption of electric power and other energy can be reduced advantageously.

We claim:

1. In a method for purifying a high-temperature reducing gas in which sulfur compounds present in the high-temperature reducing gas are absorbed and removed by an absorbent according to a dry method, and recovered, the improvement which comprises:

absorbing and removing the sulfur compounds using at least four fixed bed reactor towers filled with the absorbent, the high-temperature reducing gas to be purified being obtained from gasification of fuels selected from the group consisting of coal and fuel oil, said gas having a temperature of from 250° to 500° C., regenerating the absorbent with an oxygen-containing gas, and then reducing the regenerated absorbent using the high-temperature reducing gas in a reduction step which is separate from the absorption and regeneration step to produce a gas from the reduction step, mixing this gas with a gas discharged from the regeneration step, the mixture thus obtained being subjected to a subsequent sulfur recovery step, the reactor towers cycling through the absorption, regeneration and reduction steps; and mixing sulfur dioxide containing gas discharged from the regeneration process with a portion of the high-temperature reducing gas and subjecting the mixture to a sulfur recovery process in the presence of a catalyst under a pressure of from 10 to 25 $kg/cm^2G$, the inlet temperature of the sulfur recovery process being from 200° to 300° C., whereby sulfur dioxide is reduced directly to elemental sulfur by the reducing gas.

\* \* \* \* \*